United States Patent [19]

Ogino et al.

[11] 4,281,378
[45] Jul. 28, 1981

[54] FREQUENCY INVERTER

[75] Inventors: Yoshio Ogino, Nishinomiya; Takumi Mizukawa, Neyagawa; Hirokazu Yoshida, Osaka, all of Japan

[73] Assignee: Matsushita Electric Industrial Co., Ltd., Kadoma, Japan

[21] Appl. No.: 51,202

[22] Filed: Jun. 22, 1979

[30] Foreign Application Priority Data

Jun. 30, 1978 [JP] Japan ................................ 53-79902

[51] Int. Cl.³ ........................................... H02P 13/18
[52] U.S. Cl. ...................................... 363/96; 363/57; 363/135; 323/243; 307/252 C
[58] Field of Search ..................... 363/27–28, 363/57, 80, 85–86, 88, 96, 135, 160–162; 323/34, 36; 307/252 C, 252 J

[56] References Cited

U.S. PATENT DOCUMENTS

| 3,978,307 | 8/1976 | Amagami et al. | 363/57 X |
| 4,016,391 | 4/1977 | Kiuchi et al. | 307/252 C |
| 4,117,351 | 8/1978 | Kalfus et al. | 307/252 C |
| 4,156,274 | 5/1979 | Fukui et al. | 363/96 X |

Primary Examiner—William M. Shoop
Assistant Examiner—Peter S. Wong
Attorney, Agent, or Firm—Cushman, Darby & Cushman

[57] ABSTRACT

A frequency inverter using thyristor(s), wherein a gate circuit produces both positive triggering signals and negative reverse-bias signals by utilizing outputs of the timer in order not to fail turnings of the thyristor, and the timing of both signals are automatically controlled to by synchronized with oscillation of the resonance circuit connected to the anode and the cathode of the thyristor, so as to respond to a change of load condition, so that always suitable triggering signals and reverse-bias signals are applied to the gate of the thyristor.

4 Claims, 12 Drawing Figures (a)

(b)

(c)

(d)

(e)

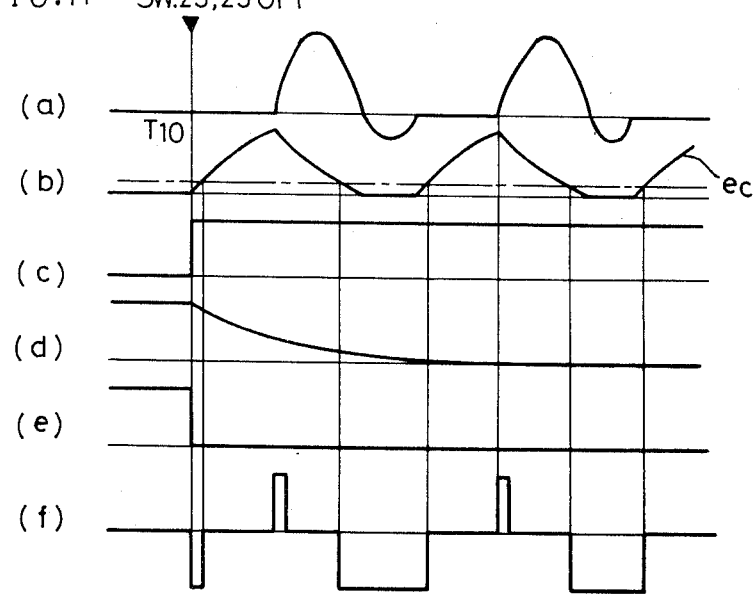
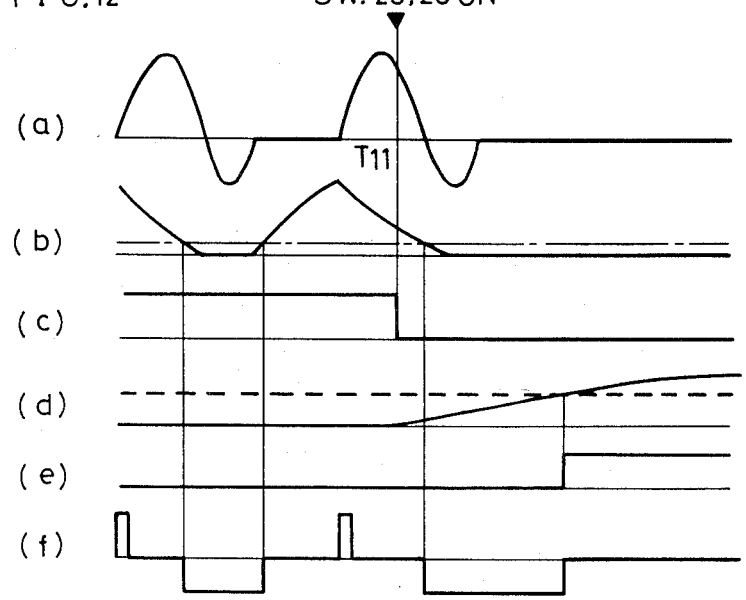

FREQUENCY INVERTER

BACKGROUND OF THE INVENTION

1. Field of the Invention

This invention relates to an improvement in a frequency inverter which translates an input alternating current power to an alternating current power of a higher frequency.

2. Description of the Prior Art

One of the basic structures of a known frequency inverter is shown in FIG. 1. An alternating current from an alternating power source 1 is rectified by a full-wave rectifier 2 into a DC current, which is fed across bus lines 3 and 4, the DC current is smoothed by a condenser 13, and a smoothed electric power is fed to a positive bus line 6 of a high-frequency part through a choking coil 5 from the positive bus line 3. Between the bus lines 4 and 6, a thyristor 7 and a return diode 8 are connected in parallel with and reversely to each other, and a series resonant circuit consisting of a condenser 9 and an output coil 10, which form a turning circuit of the thyristor 7, is also connected in parallel to the thyristor 7 and the return diode 8. Driving of the thyristor 7 is carried out by a gate-trigger circuit 12, and a start and stop of a high-frequency-chopping operation of the gate-trigger circuit 12 are controlled by a start/stop-control circuit 11. An application of reverse-bias supression voltage to the gate terminal of the thyristor 7 is generally used for shortening turning-off time of the thyristor. We explain on a typical convertional circuit as follows.

A principal part of a specific circuit of the conventional art illustrated in FIG. 1 is shown in FIG. 2, and voltage and current wave forms of various parts are shown in FIG. 3. The gate-trigger circuit 12 of FIG. 2 comprises an astable multivibrator 15 and transistors as amplifier. Wave forms of voltages between the collector-emitter electrodes (they are referred to as "VCE" hereinafter) of the output transistors Tr1, Tr2 of the astable multivibrator 15 are shown in FIG. 3 (c) and (d) respectively. The triggering voltage of the thyristor 7 is obtained by a pulse obtained by differentiating the output voltage $V_{CE}$ of the transistor Tr2. Namely on rising of the voltage $V_{CE}$ of the transistor Tr2, a transistor Tr3 turns on by a pulse made by a differential circuit consisting of a condenser 16 and a resistor 14, and accordingly a transistor Tr4 turns on. On the other hand, a zener voltage of a zener diode 17, connected to the collector electrode of the transistor Tr1, is selected larger than a negative voltage (−E2) and smaller than a sum of positive voltage (E1) and negative voltage in advance. As a result, the zener diode 17 turns into a break-over state when the transistor Tr1 turns off, and thereby makes the transistor Tr5 on. The output voltages of the transistor Tr4 and Tr5 are fed respectively as a triggering voltage and a reverse-bias voltage through a terminal G (see FIG. 3. (e)). Therefore the thyristor 7 turns on by the triggering voltage and a positive current illustrated in FIG. 3 (a) flows in the thyristor 7 in the direction from the output coil 10 to the condenser 9. A negative current shown in this figure FIG. 3 (a) is a return current flowing in the return diode 8 in the direction from the condenser 9 to the output coil 10. The time period during which the reverse current flows is a margin time for a turning of the thyristor 7. When this current extinguishes, a forward voltage is applied across the anode and cathode electrodes shown in FIG. 3 (b). In general, the application of the reverse-bias voltage of the thyristor is effective only when the return current is flowing (for preventing the tuning failure of the thyristor) and when forward edge of application of the forward-direction voltage (for preventing dv/dt firing of the thyristor). And applications of reverse-bias at other occasions than the above-mentioned cases are in vain.

However, in this conventional apparatus, the application of the reverse-bias lasts untill just before the next triggering voltage, and accordingly, the reverse-voltage is uselessly impressed during an unnecessary time period. Therefore, this conventional apparatus has the following disadvantages.

(1) Power loss is large, and
(2) There is a danger that either one or both transistors Tr4 and Tr5 may be destroyed, since there is a possibility that too much current flows through the transistors Tr4 and Tr5 when both become conductive because of charge accumulation times of the transistors. And simultaneously a rising up wave form of the triggering voltage of the thyristor 7 may become dull by the charge accumulation, and therefore a switching loss of the thyristor 7 becomes large. In order to solve these problems, there is another proposal that the transistor Tr5 is made on only for a short time by a signal made by differentiating the output signal of the transistor Tr1, thereby to apply the reverse-bias voltage to the gate of the thyristor 7 for that short time. But in such case, there are still the following problems.

(1) A circuit structure becomes complex, and
(2) The timing of the gate signals does not synchronize to the returning current from the load to the diode 8 when condition of the load changes.

There is another prior art example which uses a pulse transformer PT. The circuit of a principal part of an example of such conventional apparatus is shown in FIG. 4. A transistor Tr6 is driven by the output signals of the transistor Tr2 of the same astable multivibrator 15 as the aforementioned prior apparatus of FIGS. 1 and 2. A primary coil of a pulse transformer PT is excited by the collector current of the transistor Tr6 until the transistor Tr2 becomes on, and thereby a positive voltage is generated in the secondary coil of the pulse transformer PT. Upon turning on of the transistor Tr2, a reverse voltage is generated in the secondary coil of the pulse transformer PT. The positive and negative output signals are applied to the gate terminal G of the thyristor 7 as a trigger voltage and a reverse-bias voltage, respectively as shown in FIG. 5. In the example of FIG. 4, though its circuit is simple, there are the following problems:

(1) Power loss is large, since the triggering voltage is applied for unnecessarily long time.
(2) The reverse voltage is generated by the electromagnetic energy stored at the inductance of the pulse transformer PT, and therefore, the reverse-bias application time is limited to a short time.
(3) The reverse-bias voltage is under the influence of the gate impedance of the thyristor.

SUMMARY OF THE INVENTION

The present invention relates to a frequency inverter using thyristor (s) and provides a frequency inverter having a simple structured gate circuit which can generate a reverse-bias signal for the gate terminal of the thyristor and a triggering signal of the thyristor in synchronism to the current of a load, thereby assuring on automatic response of operation of the circuit to a load change, and low power loss of the frequency inverter. Besides, the present invention can afford a gate circuit which is quite stable and highly reliable despite variables of electric components.

BRIEF EXPLANATION OF THE DRAWINGS

FIGS. 11 and 12 are wave form charts wherein waveforms (a) to (f) are for parts designated by (a) to (f) of the FIG. 10.

DESCRIPTION OF PREFERRED EMBODIMENT

A frequency inverter of the present invention comprises:

a thyristor connected across a positive feed line and a negative feed line, a resonance circuit comprising an inductor and a condenser which are connected across said positive and negative feed lines, a diode connected in parallel to but in the inverse direction to the thyristor and a gate signal circuit which generates gate signals from its output terminal to the gate terminal of the thyristor, and is characterized in that:

the gate signal circuit comprising a charge-discharge circuit having a condenser and a resistor, and the charge-discharge circuit is connected to a switching circuit for making said condenser charge and discharge responding to the voltage of the thyristor, a first comparator circuit which compares output signals of the charge-discharge circuit with a first predetermined reference voltage and generates positive signals of specified timings to the output terminal and a second comparator circuit which compares the output signals of the charge-discharge circuit with a second predetermined reference voltage and generates negative signals to the output terminal with timings different from those of the specified timings of the positive signals.

Figure 1:
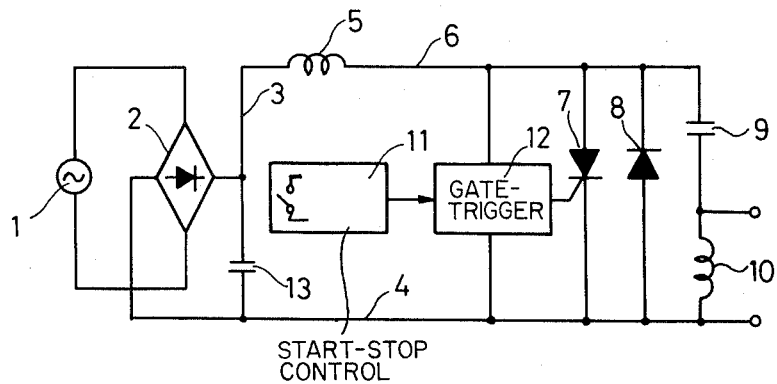
FIG. 1 is a block diagram of a fundamental construction of a conventional frequency inverter.
Figure 2:
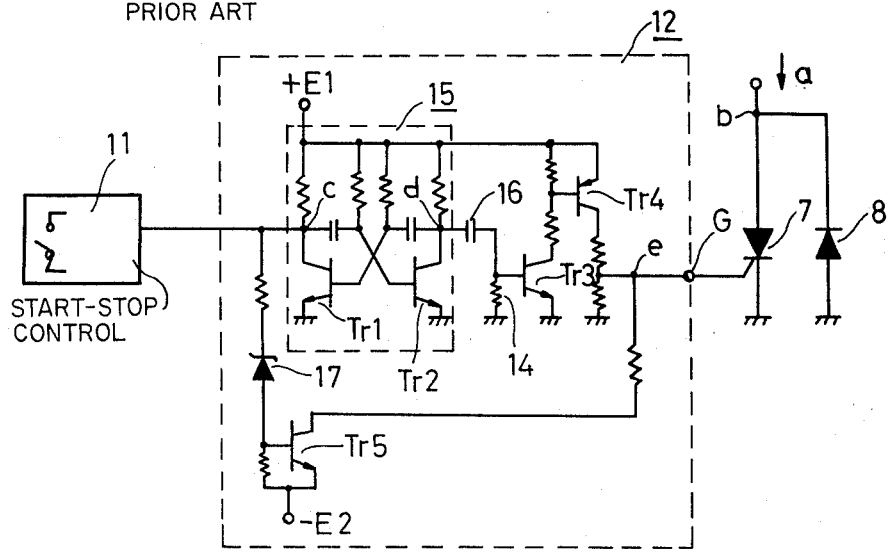
FIG. 2 is a circuit diagram of a principal part of the apparatus of FIG. 1.
Figure 3:
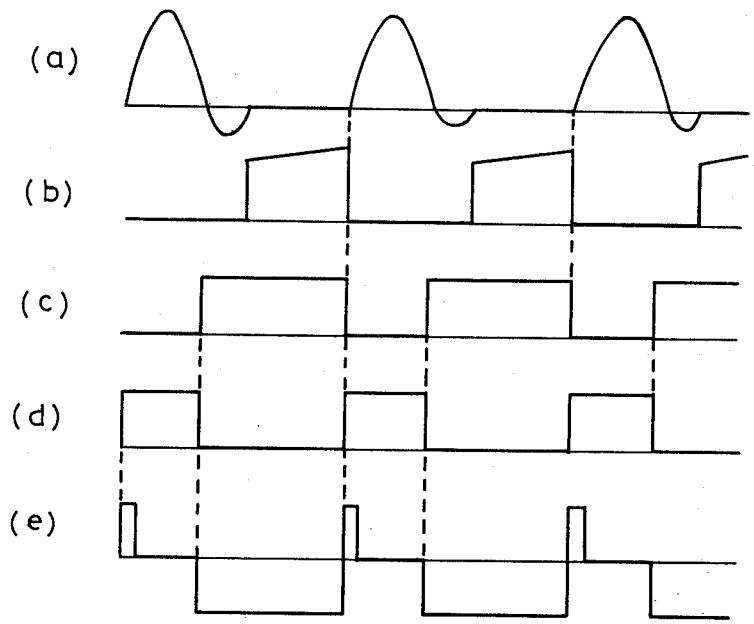
FIG. 3 is a wave form chart wherein waveforms (a) to (e) are for parts designated by (a) to (e) of FIG. 1.
Figure 4:
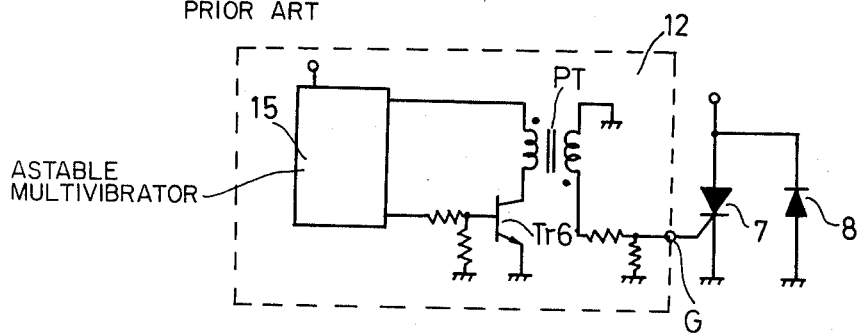
FIG. 4 is a partial circuit diagram of another conventional frequency inverter.
Figure 5:
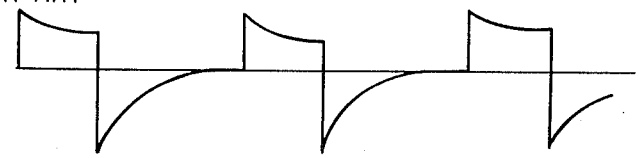
FIG. 5 is a wave form chart at the output terminal (G) of FIG. 4.
Figure 6:
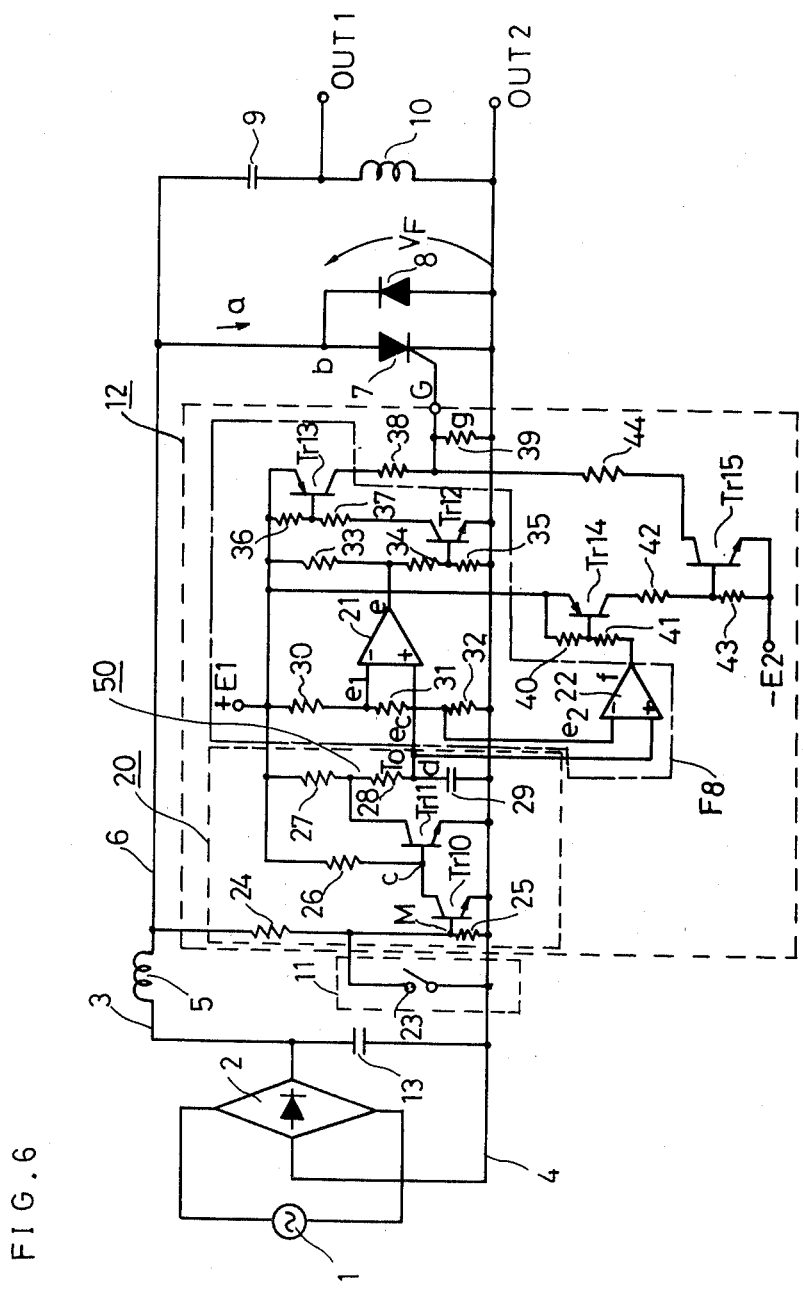
FIG. 6 is a circuit diagram of an embodiment of the present invention.

An embodiment of the frequency inverter in accordance with the present invention is shown in FIG. 6. In the embodiment, a full-wave rectifier 2 is connected to an alternating current power source 1, and the output lines of the rectifier 2 are connected across both terminals of a smoothing condenser 13. A positive bus line 3 connected to the positive terminal of the smoothing condenser 13 feeds electric power to a thyristor 7 through a choking coil 5 and another positive bus line 6. Across the anode and cathode of the thyristor 7 is connected a return diode 8 in inverse direction to the former. A series resonant circuit consisting of a condenser 9 and an output coil 10 is connected across the anode and the cathode of the thyristor 7, and the capacitance of the condenser 9 and the inductance of the coil 10 mainly determines frequency of the inverter output. Reference numerals OUT 1 and OUT 2 are output terminals of this frequency inverter.

The gate terminal G of the thyristor 7 is connected to a gate-trigger circuit 12 which includes a timer circuit 20 and comparators 21 and 22. The timer circuit 20 is for controlling timings of the positive and negative signals to the gate of the thyristor 7.

The timer circuit 20 includes a dividing circuit consisting of resistors 24 and 25 for detecting a voltage change across the anode and cathode of the thyristor, a transistor amplifier comprising the transistors Tr10 and Tr11, which operates to switch a charge-discharge circuit 50 in accordance with the voltage across the thyristor 7. The base electrode of the transistor Tr10 is connected to the junction point M between the resistors 24 and 25 of the dividing circuit. The charge-discharge circuit 50 consists of resistors 27, 28 and a condenser 29. The junction point between the resistors 27 and 28 is connected to the collector of the transistor Tr11, so that the transistor Tr11 switches the charge-discharge circuit 50. A start/stop control circuit 11 includes a switch 23 which is connected across the junction point M and the negative bus line 4. Resistors 30, 31 and 32 constitute a dividing circuit which feeds reference voltages $e_1$ and $e_2$ to comparators 21 and 22, respectively. The reference voltage $e_1$ is usually higher than the reference voltage $e_2$ because of its connection. The output terminal to of the condenser 29 is connected to the input terminals of the comparators 21 and 22, and the output level of the comparators 21 and 22 is Hi level when the terminal voltage $e_c$ of the condenser 29 is higher than the reference voltages $e_1$ and $e_2$, respectively. The comparator 21 controls the timing to feed a trigger pulse for the gate of the thyristor 7, and its output is given to the base of a transistor Tr12. Resistors 33, 34 and 35 are provided to feed a base-bias voltage of the transistor Tr12. Resistors 36 and 37 are load resistors of the transistor Tr12. The comparator 22 controls the timing to feed a reverse-bias pulse for the gate of the thyristor 7, and its output is given to the base of a transistor Tr14. Resistors 40 and 41 are provided so as to feed a base-bias voltage of the transistor Tr14. Resistors 42 and 43 are load resistors of the transistor Tr14. A series connection of a transistor Tr13, resistors 38 and 44 and a transistor Tr15 is connected across a positive terminal +E1 and a negative terminal −E2 of a DC power source for the gate-trigger circuit 12. A resistor 39 is a common resistor to allow flowing of the collector currents of the transistors Tr13 and Tr15 therethrough. The junction point of the resistors 38 and 44 is connected to the gate electrode of the thyristor 7.

Figure 7:
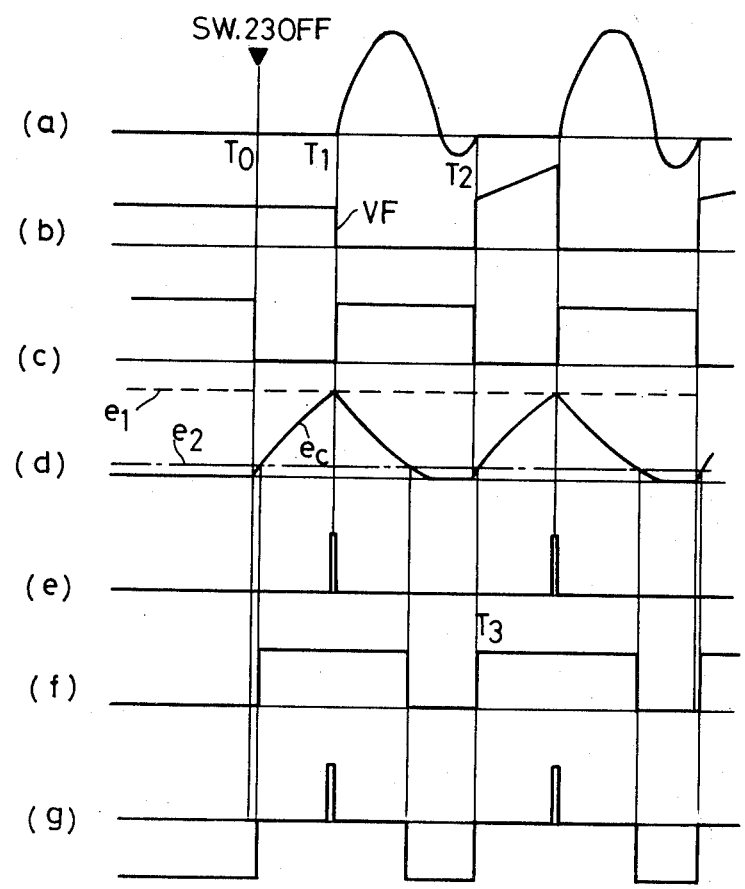
FIG. 7. is a wave form chart wherein waveforms (a) to (g) are for parts designated by (a) to (g) of the FIG. 6.

OPERATION (1) OFF State: An OFF state of the inverter wherein high frequency output at the output terminals OUT1 and OUT2 is OFF is obtained by closing of the switch 23. During the time while the switch 23 is closed until the time To in FIG. 7, the base current of the transistor Tr10 is zero independently of the operation of the thyristor. Therefore the transistor Tr10 keeps in the off state as shown in FIG. 7 (c), and the transistor Tr11 keeps in the on state as the base current flows through the resistor 26. Then the terminal voltage $e_c$ of the condenser 29 keeps in the zero state as shown in FIG. 7 (d). At this state, since the reference voltages $e_1$ and $e_2$ are also higher than the terminal voltage $e_c$ of the condenser 29, the comparators 21 and 22 are also at Hi level as shown in the FIGS. 7 (e) and (f). Therefore the transistors Tr12 and Tr13 are in the off state, on the contrary, the transistors Tr14 and Tr15 are in on state. Consequently the thyristor 7 is off since the reverse-bias voltage is applied to its gate terminal G and hence the frequency inverter does not operate.

(2) ON State: An ON state of the inverter is obtained by opening the switch 23. At the time To, since the switch 23 is opened, the transistors Tr10 and Tr11 of the timer circuit 20 are driven responding to the voltage $V_F$ across the anode and the cathode of the thyristor 7. Namely the thyristor is off at that time, and the voltage $V_F$ is equal to a higher DC voltage, the smoothed voltage. Therefore, since the base current of the transistor Tr10 flows through the resistor 24, the transistor Tr10 turns on and the transistor Tr11 turns off. Hence the condenser 29 of the charge-discharge circuit 50 is gradually charged at a predetermined time constant by a current through the resistors 27 and 28 from the positive power source +E1, as shown in FIG. 7 (d). When the voltage $e_c$ exceeds the reference voltage $e_1$, the comparator 21 turns to Lo state from Hi state as shown in FIG. 7 (e) and makes the transistors Tr12 and Tr13 on. Therefore, as illustrated in FIG. 7 (g), the gate trigger voltage is applied to the thyristor 7. As the thyristor 7 turns on and hence its voltage $V_F$ becomes zero by an application of the gate trigger as per the FIG. 7 (b), the transistor Tr10 turns off. At that time the transistor Tr11 turns on, and makes the condenser 29 discharge through the resistor 28. Hence the terminal voltage $e_c$ of the condenser 29 decreases, and immediately the output of the comparator 21 turns to Lo state from Hi state again, so the gate voltage of the thyristor 7 becomes zero as shown in FIGS. 7 (d), (e) and (g). At the time T1, the thyristor 7 turns on and load current flows through the capacitor 9, the thyristor 7 and the output coil 10 during a specified time period mainly decided by the values of the condenser 9 and the output coil 10 as illustrated at positive part of FIG. 7 (a). When a load is connected across both output terminals OUT1 and OUT2, an AC output current is fed to the load. And then the return current flows through the return diode 8, the capacitor 9 and the output coil 10 as illustrated at positive part of FIG. 7 (a). The turning-off of the thyristor must be made in the period of return current, in order to fire the thyristor in the next cycle. At the time T2, the extinction of the return current, the DC voltage is applied to the thyristor again from the positive bus line 6. At this time the thyristor 7 must be kept off.

On the other hand, since the reference voltage $e_2$ of the comparator 22 is held still lower than the reference voltage $e_1$ mentioned above, the comparator 22 is in Hi state from just after the rising of the condenser voltage $e_c$ to just before the completion of the discharge as described at FIG. 7 (f). While the output of the comparator 22 is in Hi state, transistors Tr14 and Tr15 are off and the reverse-bias voltage is not generated. Consequently, by suitably selecting the discharging time-constant of the condenser 29 and the reference voltage $e_2$, a reverse-bias voltage is generated for a time period which can cover the time period of the return current and the time of a forward voltage rising as can be understood from FIG. 7 (a), (b) and (g).

After that time T2, the same operations as described above are repeated. In this embodiment, the period, when the reverse-bias voltage is applied, is decided by the discharge time constant of the charge-discharge circuit 50 and the reference voltage $e_2$. And since the completion time T3 of each reverse-bias voltage is determined to be sufficiently after a turn-off of the thyristor 7, and at that time the voltage $V_F$ of the thyristor 7 already has risen to a sufficiently high voltage. Therefore, the timing of gate signals are automatically controlled by the high frequency output voltage, so as to control phase and width (time period) of the reverse-bias voltage to the thyristor gate to efficiently correspond to a change of load condition. Therefore the operation of the apparatus is quite stable. Furthermore power loss of the inverter is small, since the time period of reverse-bias voltage is automatically controlled to a short time responding to change of time period of the return current.

In the embodiment, the reference voltage $e_1$ is usually higher than the reference voltage $e_2$ because the reference voltage $e_1$ is further divided by resistors 31 and 32 to produce the voltage $e_2$. If the gate triggering signal and the reverse-bias signal generates at the same time, the output transistors Tr13 and Tr15 may be destroyed, and hence, further the thyrister 7 may cause trouble. However with such arrangement of producing $e_2$ by dividing the voltage $e_1$ even if the resistors 27 to 32 or the condenser 29 has a problem, these signals are never generated at the same time, thereby making the reliability of the apparatus high.

In this first embodiment, since it is not particularly structured to apply a feed-back to the reference voltage $e_1$ from the output of the comparator 21, the gate voltage for the thyristor 7 is extinguished at the same time when the thyristor 7 turns on. Therefore, there is a fear that the thyristor 7 can not be retained in on state at near the lowest voltages of the power source if the thyristor 7 turns on by the gate triggering signals, since the forward current of the thyristor 7 is very small. Particularly, when the forward current of the same degree as the latching current of the thyristor 7 flows, the thyristor 7 cannot keep its on state unless the gate voltage is fed continuously till the forward current exceeds the latching current. Therefore, it is necessary to widen the gate pulse width until the exceeding of the forward current.

Figure 8:
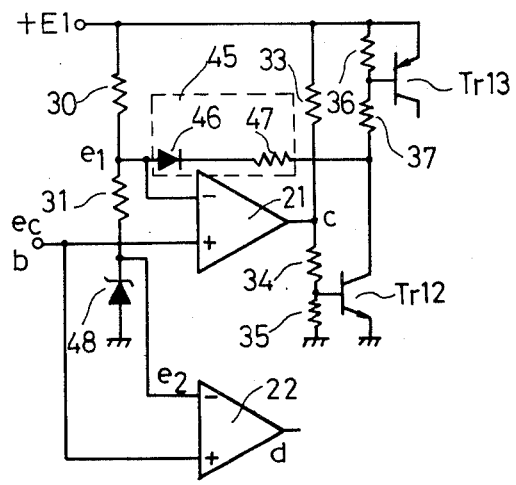
FIG. 8 is a partial circuit diagram of a modified example of a part FIG. 8 encircled by chain lines in FIG. 6.
Figure 9:
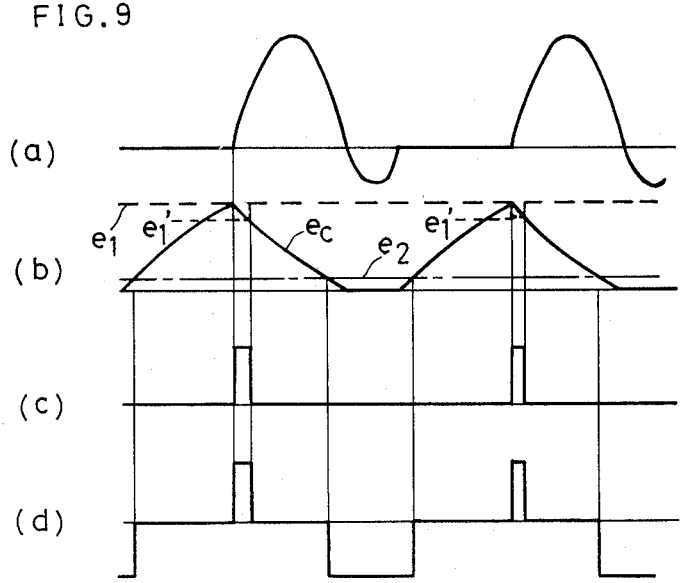
FIG. 9 is a wave form chart wherein wave forms (a) to (d) are for parts designated by (a) to (d) of the frequency inverter in accordance with the modified example having the partial circuit of FIG. 8.

A second embodiment to improve the abovementioned problem is explained as follows: The essential part of this embodiment is different from the first embodiment at the part encircled by a chain line F8 of FIG. 6. FIG. 8 is a circuit diagram of a part to replace the F8 part of FIG. 6. In this embodiment, there is provided a negative feed back circuit 45 consisting of a series circuit of a diode 46 and a resistor 47 connecting across the collector of the transistor Tr12 and the input terminal of the comparator 21. The operation of this embodiment is shown by the wave form charts FIG. 9. The terminal voltage $e_c$ of the condenser 29 rises at a predetermined time constant, and reaches reference voltage $e_1$. At that time the output of the comparator 21 becomes Hi and the transistor Tr12 turns on. Then a constant current flows through the negative feed back circuit 45 from the input terminal of the comparator 21 to the collector of the transistor Tr12, and the reference voltage $e_1$ decreases to $e'_1$ as shown in FIG. 9 (b). Therefore as shown in FIG. 9 (c), the Hi output of the comparator 21 is retained for a short time till the terminal voltage $e_c$ of the condenser 29 becomes lower than the reference voltage $e'_1$. The negative feed back circuit enables widening the gate pulse width to such extent that the forward current of the thyristor 7 becomes larger than the latching current as shown in FIG. 9 (d). In the embodiment, a zener diode 48 is used instead of the resistor 32 of FIG. 6, so that the reference voltage $e_2$ can keep a constant value. By such structure, the thyristor 7 turns on with a high certainty.

Figure 10:
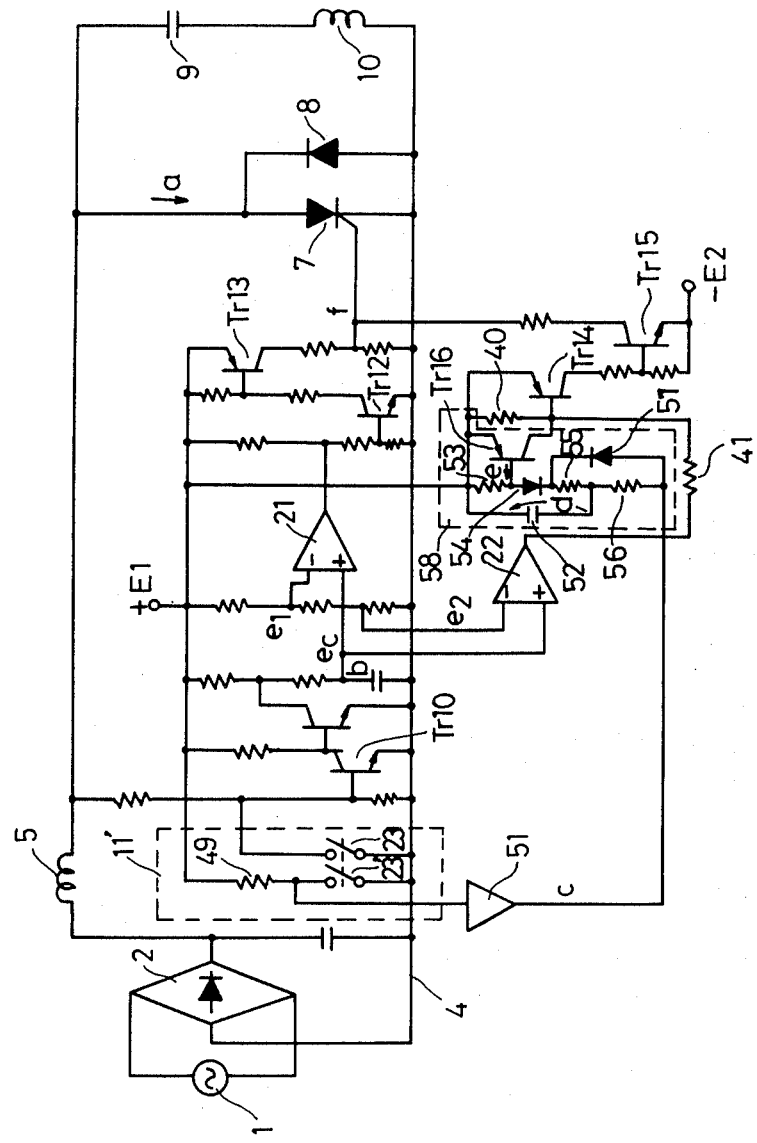
FIG. 10 is a circuit diagram of another frequency inverter embodying the present invention.

In the abovementioned embodiments, when the oscillation stops, as the terminal voltage $e_c$ of the condenser 29 becomes zero and lower than the reference voltage $e_2$, the comparator 22 is always in Lo state. Hence the transistors Tr14 and Tr15 keep on states and apply the reverse-bias voltage to the gate terminal G of the thyristor 7. In such oscillation stopping state, the reverse-bias is unnecessary in view of electric power efficiency and reliability, and hence, it is desirable to prohibit the application of the reverse-bias during the time period of oscillation stopping. The third embodiment for this purpose is explained below with reference to FIG. 10. In the embodiment, start/stop controlling circuit 11' further includes a resistor 49 and a switch 23' linked to the switch 23, which are connected in series with each other across the positive power source +E1 and negative bus line 4. The buffer circuit 51 of a TTL or C-MOS device is connected across the junction point of the series circuit and a reverse bias inhibitation circuit 58. The reverse bias inhibitation circuit 58 is for stopping reverse-bias signals when the oscillation stops, and is structured as follows; A series circuit consisting of a resistor 53, a diode 54, resistors 55 and 56 is connected across the positive power source +E1 and the output terminal of the buffer circuit 51. A condenser 52 is connected in parallel with the series connection of the resistor 53, the diode 54 and the resistor 55. A diode 57 of reverse direction is connected in parallel with the series connection of the resistor 55 and 56. The base electrode of the transistor Tr16 is connected to the junction point of the resistor 53 and the diode 54, and the collector thereof is connected to the base electrode of the transistor Tr14.

The operation of the embodiment is as follows. At a time T10 of FIG. 11, the switches 23 and 23' of the start/stop control circuit 11' are simultaneously open and thereby the terminal voltage $e_c$ rises up in the same way as the former embodiments. The output signal of the buffer circuit 51 also rises by the opening of the switch 23' as shown in FIG. 11 (c). Then electric charges stored by the condenser 52 are gradually discharged through a first path consisting of the resistor 49, the buffer circuit 51, the diode 57, the resistor 55 and a second path consisting of the resistor 49, the buffer circuit 51 and the resistor 56, as shown in FIG. 11 (d). When discharging, the voltage at the output terminal of the buffer circuit 51 is nearly equal to that of the positive power source +E1 and the cathode voltage of the diode 57 becomes about 0.7 V lower than the voltage +E1. Since the forward voltage of the diode 54 is also about 0.7 V, the voltage across the base and emitter electrode of the transistor Tr16 is about zero. After the completion of the discharging, the base electrode of the transistor Tr16 does not receive any particular voltage. Therefore, the transistor Tr16 remains off, as shown in FIG. 11 (e), and the reverse-bias voltage inhibition circuit 58 does not operate. Hence the reverse-bias voltage is applied to the thyristor 7 from a first cycle as the abovementioned embodiments.

On the contrary, in case the device is stopped of its operation by closing the switches 23 and 23', the impression of reverse-bias voltage must be inhibited after a predetermined time after the closings of the switches 23 and 23'. When the switches 23 and 23' are closed at a time T11 as shown in FIG. 12, the output of the buffer circuit 51 falls down immediately. At that time, the condenser 52 begins gradually to be charged at a specified time constant based on the condenser 52 and the resistor 56 as shown in FIG. 12 (d). Thereby the base current of the transistor Tr16 does not flow until the charged voltage of the condenser 52 reaches about 1.4 V, and hence, the application of the reverse-bias signal by the transistors Tr14, Tr15 is not inhibited. When after the specified period from the time T11 the transistor Tr16 turns on and the collector current thereof flows through the resistor 41, the transistors Tr14 and Tr15 become off and the application of the reverse-bias signal stops.

What is claimed is:

1. A frequency inverter comprising:
    a thyristor connected across a positive feed line and a negative feed line, a resonance circuit comprising an inductor and a condenser which are connected across said positive and negative feed lines,
    a diode inversely connected in parallel to said thyristor, and
    a gate signal circuit which generates gate signals from its output terminal to the gate terminal of said thyristor,
    characterized in that
    said gate signal circuit comprises
    a charge-discharge circuit having a second condenser and a resistor branch, said charge-discharge circuit being connected to a switching circuit for making said second condenser charge and discharge responding to the voltage across the anode and the cathode of the thyristor,
    a first comparator circuit which compares output signals of said charge-discharge circuit with a first predetermined reference voltage and generates positive signals of specified timings to said output terminal, and
    a second comparator circuit which compares output signals of said charge-discharge circuit with a second predetermined reference voltage and generates negative signals to said output terminal with timings different from those of said specified timings of said positive signals.

2. A frequency inverter according to claim 1, wherein said gate signal circuit comprises a negative feedback circuit connected to said first comparator in a manner to change said first predetermined reference voltage responding to the output signal of said first comparator.

3. A frequency inverter according to claim 1, wherein said second predetermined reference voltage is fed from a voltage dividing circuit which divides said first predetermined reference voltage.

4. A frequency inverter according to claim 1, wherein said gate signal circuit further comprises a reverse-bias inhibition circuit which includes a charging-and-discharging circuit that includes a condenser, resistors and a diode and has different time constants of charging and discharging, said reverse-bias inhibition circuit being connected to the output terminals of the second comparator in a manner that the inhibition circuit inhibits the generation of said negative signals after an application of an operation-stopping control signal having a predetermined time length, and that the inhibition circuit allows generation of said negative signals immediately after an application of an operation-starting control signal.

* * * * *